(12) United States Patent
Hinds et al.

(10) Patent No.: US 9,990,179 B2
(45) Date of Patent: Jun. 5, 2018

(54) ARITHMETIC OPERATION INPUT-OUTPUT EQUALITY DETECTION

(71) Applicant: ARM LIMITED, Cambridge (GB)

(72) Inventors: Christopher Neal Hinds, Austin, TX (US); David Raymond Lutz, Austin, TX (US)

(73) Assignee: ARM Limited, Cambridge (GB)

( * ) Notice: Subject to any disclaimer, the term of this patent is extended or adjusted under 35 U.S.C. 154(b) by 11 days.

(21) Appl. No.: 15/169,996

(22) Filed: Jun. 1, 2016

(65) Prior Publication Data

US 2017/0351488 A1 Dec. 7, 2017

(51) Int. Cl.
*G06F 7/48* (2006.01)
*G06F 7/485* (2006.01)

(52) U.S. Cl.
CPC .................................. *G06F 7/485* (2013.01)

(58) Field of Classification Search
None
See application file for complete search history.

(56) References Cited

U.S. PATENT DOCUMENTS

| | | | | |
|---|---|---|---|---|
| 7,464,128 B1* | 12/2008 | Pitsianis | ................. | G06F 7/724 708/492 |
| 7,765,221 B2* | 7/2010 | Zimmerer | ............... | G06F 17/10 704/224 |
| 8,140,826 B2* | 3/2012 | Archer | .............. | G06F 15/17318 708/534 |
| 8,782,114 B2* | 7/2014 | Yonemura | ............. | H04L 9/3073 708/492 |
| 2012/0047194 A1* | 2/2012 | Stergiou | ................ | H04L 9/3239 708/700 |
| 2015/0378676 A1* | 12/2015 | Cilibrasi | ................... | G06F 7/38 708/495 |

\* cited by examiner

*Primary Examiner* — David H Malzahn
(74) *Attorney, Agent, or Firm* — Nixon & Vanderhye P.C.

(57) ABSTRACT

Apparatus and a corresponding method are disclosed relating to circuitry to perform an arithmetic operation on one or more input operands, where the circuitry is responsive to an equivalence of a result value of the arithmetic operation with at least one of the one or more input operands, when the one or more input operands are not an identity element for the arithmetic operation, to generate a signal indicative of the equivalence. Idempotency (between at least one input operand and the result value) is thus identified.

2 Claims, 6 Drawing Sheets

ARITHMETIC OPERATION INPUT-OUTPUT EQUALITY DETECTION

TECHNICAL FIELD

The present disclosure relates to data processing. More particularly, it relates to arithmetic operations in data processing.

BACKGROUND

A data processing apparatus, such as a microprocessor, may be provided with circuitry to enable it to perform an arithmetic operations on input operands. Typically the circuitry will be capable of performing more than one type of arithmetic operation and the data processing apparatus will be arranged to respond to a number of different program instructions, each corresponding to a specific arithmetic operation, and thus defining both the arithmetic operation to be carried out and the input operands. Generally the result of such arithmetic operations is expected to be determinative, reproducible, and consistent, such that repeated performance of an arithmetic operation can be expected to produce well-defined results.

SUMMARY

At least one example described herein provides a data processing apparatus comprising: circuitry to perform an arithmetic operation on one or more input operands, wherein the circuitry is responsive to an equivalence of a result value of the arithmetic operation with at least one of the one or more input operands, when the one or more input operands are not an identity element for the arithmetic operation, to generate a signal indicative of the equivalence.

At least one example described herein provides a method of processing data comprising: performing an arithmetic operation on one or more input operands; and generating a signal indicative of an equivalence of a result value of the arithmetic operation with at least one of the one or more input operands when the one or more input operands are not an identity element for the arithmetic operation.

At least one example described herein provides a data processing apparatus comprising: means for performing an arithmetic operation on one or more input operands; and means for generating a signal indicative of an equivalence of a result value of the arithmetic operation with at least one of the one or more input operands when the one or more input operands are not an identity element for the arithmetic operation.

BRIEF DESCRIPTION OF THE DRAWINGS

The present techniques will be described further, by way of example only, with reference to embodiments thereof as illustrated in the accompanying drawings, in which.

DESCRIPTION OF EXAMPLE EMBODIMENTS

Figure 1:
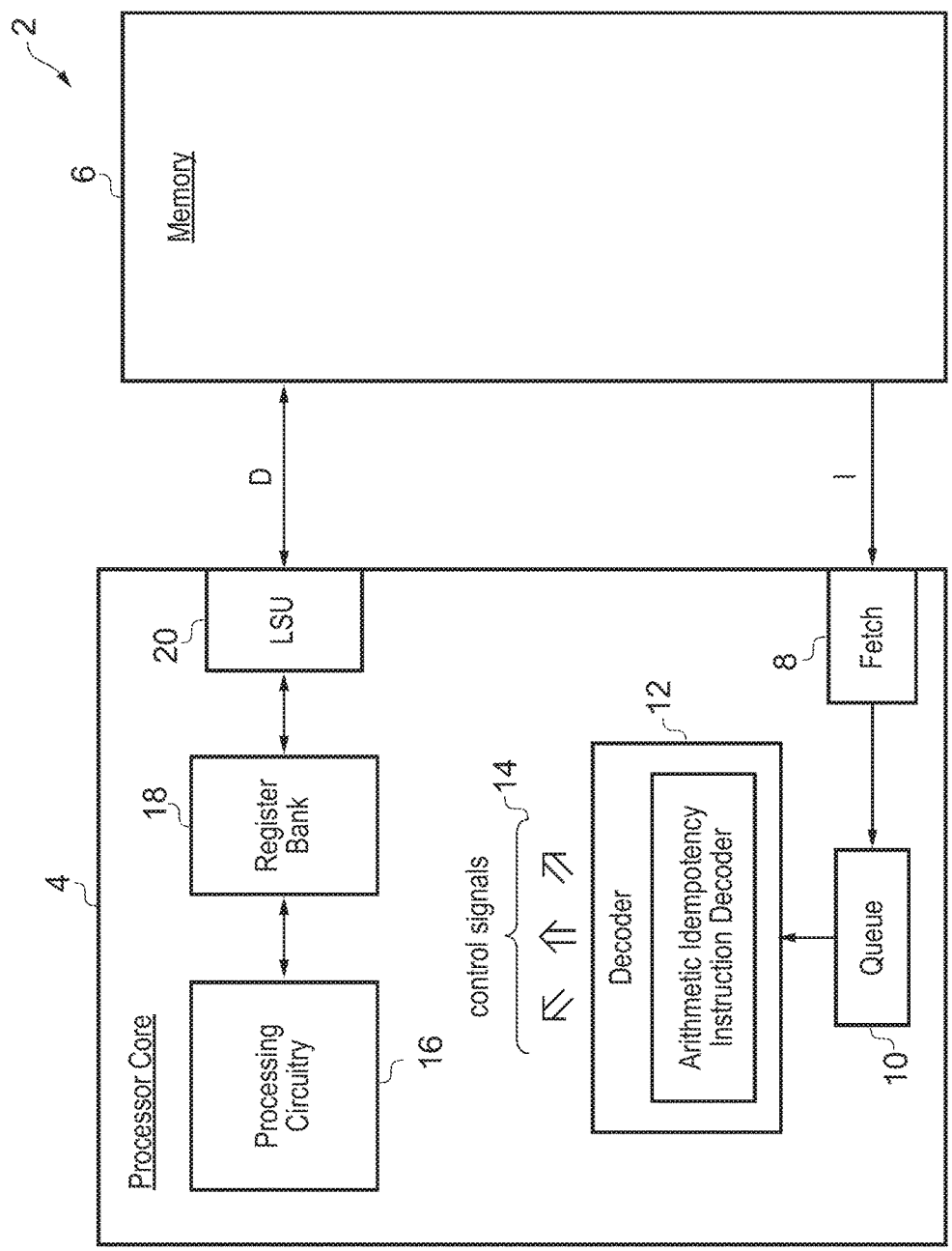
FIG. 1 schematically illustrates an apparatus in one embodiment comprising circuitry to perform an arithmetic operation.

In some example embodiments there is a data processing apparatus comprising: circuitry to perform an arithmetic operation on one or more input operands, wherein the circuitry is responsive to an equivalence of a result value of the arithmetic operation with at least one of the one or more input operands, when the one or more input operands are not an identity element for the arithmetic operation, to generate a signal indicative of the equivalence.

The present techniques recognise that there are circumstances in which a result value of an arithmetic operation carried out by data processing apparatus can be equal to an input operand of the arithmetic operation, where the input operand is not an identity element for the arithmetic operation. Accordingly, it will be recognised that circumstances in which, for example, one of two input operands of an arithmetic operation is the identity element for that arithmetic operation, and a result value is generated which is equal to the other of the two input operands, are not the subject of the present discussion. For example it is trivial to note the equivalence of the result value two of an addition operation applied to the input operands two and zero with one of those input operands. Instead, the present techniques have surprisingly recognised circumstances which arise in the practical implementation in a data processing apparatus of such arithmetic operations in which a strictly speaking mathematically incorrect (or at least incomplete) result value of an arithmetic operation can arise, for example as a result of the finite precision which the data processing apparatus supports. To take just one example, it has been identified that there are circumstances in which an accumulation operation (typically after many iterations of application) can generate a result value for the accumulation which, unexpectedly, does not differ from the accumulating value prior to that iteration. In other words the accumulating value prior to the operation, which formed one input operand of that operation, is idempotent with the accumulating value given by the result of that operation. As will be recognised from the comments above, this effective idempotency of the accumulation operation is of course mathematically speaking incorrect, and has unexpectedly resulted from particular characteristics of the data processing apparatus: the circuitry with which it performs the arithmetic operation, the manner in which the result of the arithmetic operation is handled, and so on. Moreover, it is important to note that this should not be interpreted to imply that the arithmetic operation has been wrongly implemented in the data processing apparatus, but rather that practical constraints on the manner in which such an arithmetic operation can be carried out by the data processing apparatus, such as finite precision and/or formatting constraints, may result, in certain particular circumstances, in such idempotency.

The present techniques recognise that the arithmetic operation which may, under certain circumstances, give rise to such idempotency may take a wide variety of forms, since as mentioned above such idempotency arises due to practical constraints in the manner in which the arithmetic operation is handled by the data processing apparatus. In some examples the arithmetic operation is a floating-point operation. The floating-point format generally has various advantages over integers when performing data processing operations on values in this format (for example such as having a wider range, better exception handling, and the ability to handle fractional data). However, to consider an example in the FP16 format, note that the maximum finite number in FP16 is $2^{16}-2^5=65,504$. Nevertheless, when incrementing an accumulation value by one at each iterative step, this value will never be reached since counting by one becomes idempotent at 2048 in FP16 (i.e. 2048+1=2048). Note that the idempotency value is not always 2048, since in fact it will depend on the input values and the floating-point format.

Accordingly, in some examples the one or more input operands are in floating-point format. Equally, in other examples the one or more input operands are in fixed-point format. In embodiments in which the circuitry provided to carry out the arithmetic operation is arranged to handle values in floating-point format, additional circuitry can be provided to convert one or more input operands in fixed-point format into floating-point format before being passed to the circuitry which carries out the arithmetic operation. Equally, it is contemplated that it would be possible for the circuitry provided to carry out the arithmetic operation to be arranged to handle values in fixed-point format and thus for additional circuitry to be provided to convert one or more input operands in floating-point format into fixed-point format in advance of the arithmetic operation.

The arithmetic operation may take a variety of forms and as a consequence the identity element may take a corresponding variety of forms. In some examples the arithmetic operation is an operation for which the identity element is zero. For example addition and subtraction are operations for which the identity element is zero. In some examples the arithmetic operation is an accumulation operation, i.e. an addition operation (typically repeatedly carried out) to apply a given increment to an accumulating value.

Accordingly, in some embodiments the arithmetic operation is an increment operation, and the identity element is zero. In such examples the increment value may be the same at each iteration or may vary. The increment operation may for example add a predetermined increment to an input operand.

In some examples other types of arithmetic operation may be involved for which the identity element is unity (i.e. one), such as is the case for multiplication and division operations. The arithmetic operation may therefore be an operation for which the identity element is unity.

In some examples the data processing apparatus comprises an instruction decoder to decode program instructions which specify processing operations, and the instruction decoder is responsive to an arithmetic idempotency instruction to cause the circuitry to perform the arithmetic operation on the one or more input operands and is responsive to the arithmetic idempotency instruction to cause the circuitry to generate the signal indicative of the equivalence when the at least one of the one or more input operands is not the identity element for the arithmetic operation. The configuration of the data processing apparatus thus to be responsive to a specific type of arithmetic instruction, which further causes the data processing apparatus to detect result value idempotency in the circumstances described above, provides the programmer with a useful tool selectively to identify such idempotency.

For example, in some embodiments the arithmetic operation is an increment operation, and the increment operation adds an increment specified by the arithmetic idempotency instruction to the at least one of the one or more input operands. Thus the increment to be applied may also be defined by the programmer, and in some examples this may be explicitly defined within the arithmetic idempotency instruction, either by providing the increment value itself or by indicating a storage location in which that increment value is to be found. In other examples the increment value may be implicit in the sense that it is not defined by the arithmetic idempotency instruction, but rather the data processing apparatus has been configured to apply a predetermined increment value in response to the instruction.

According to the present techniques it is proposed that, where such idempotency is identified, the data processing apparatus could respond in a wide variety of ways depending on the particular requirements of the implementation. In order to support some such responses in some examples the data processing apparatus comprises result modification circuitry responsive to the signal indicative of the equivalence to generate an additional response in addition to generation of the result value, wherein when the signal indicative of the equivalence is not generated the result modification circuitry does not generate the additional response. It should be recognised that the additional response may take a variety of forms, which may or may not modify the result value which the data processing apparatus provides as the outcome of the arithmetic operation. In other words, an example additional response which can be provided is indeed to modify the result value, whilst another example additional response which can be provided is to leave the result value unchanged but to additionally cause another event in the data processing apparatus.

For example, in some embodiments generating the additional response comprises substituting a predetermined value for the result value of the arithmetic operation. The predetermined value may take a variety of forms depending on the requirements of the particular implementation. It could for example be a particular selected number, whilst in other examples it could be a special value such as NaN, +INF, −INF, etc., depending on the consequence which the programmer wishes to follow from such idempotency.

In some embodiments generating the additional response comprises writing a value to a storage location. This value may thus take a number of forms, depending inter alia on the particular storage location to which it is written. At its simplest it could be a binary bit, providing a flag to indicate that idempotency has been detected. In some examples the storage location is a register in the data processing apparatus.

Other responses to the detection of idempotency are also contemplated and in some examples the data processing apparatus comprises exception generation circuitry responsive to the signal to generate an exception. It is generally expected that the detection of idempotency would be relatively infrequent and on the other hand that the occurrence of such idempotency is an event which requires special handling or intervention, and thus the generation of an exception may be chosen as the desired event to occur in response to the (idempotency identification) signal.

The data processing apparatus may handle the result value in a variety of ways including certain kinds of sub-selection from or adaptation applied to the "full" result value generated. For example, it may be required for formatting reasons for an adaptation to be applied to the result value, such as when the output format cannot represent the full precision with which the arithmetic operation has been carried out. One example of such adaptation is present in some embodiments in which the circuitry comprises rounding circuitry to apply a rounding operation to the result value to generate a rounded result value and the circuitry is responsive to the equivalence of the rounded result value of the arithmetic operation with at least one of the one or more input operands, when the one or more input operands are not the identity element for the arithmetic operation, to generate the signal indicative of the equivalence. Accordingly, the present techniques contemplate that idempotency could be detected at different stages of result value generation, i.e. at the direct output of the arithmetic operation or after a rounding operation has been applied to the output of the arithmetic operation.

In some embodiments the circuitry is arranged to perform the arithmetic operation on at least one input operand which spans more than one memory location. In other words, the present techniques recognise that there is a need for such idempotency detection to be provided not only for arithmetic operations performed on input operands which individually conform to the "regular" data size of the architecture of the data processing apparatus (e.g. 32-bit, 64-bit, etc.), but also for input operands (and result values) which span two or more memory locations.

In some example embodiments there is a method of processing data comprising: performing an arithmetic operation on one or more input operands; and generating a signal indicative of an equivalence of a result value of the arithmetic operation with at least one of the one or more input operands when the one or more input operands are not an identity element for the arithmetic operation.

In some example embodiments there is a data processing apparatus comprising: means for performing an arithmetic operation on one or more input operands; and means for generating a signal indicative of an equivalence of a result value of the arithmetic operation with at least one of the one or more input operands when the one or more input operands are not an identity element for the arithmetic operation.

Some particular embodiments will now be described with reference to the figures.

FIG. 1 schematically illustrates a data processing apparatus 2 in one example embodiment. The data processing apparatus 2 comprises a processor core 4 and a memory 6. Instructions (I) which define the data processing operations to be carried out by the processor core are retrieved from the memory by the fetch circuitry 8, and then queued in a queue 10, before being passed to the instruction decoder circuitry 12. Whilst the processor core 4 shown in FIG. 1 is capable of responding to a wide range of instructions, in the particular example shown the instruction decoder circuitry 12 is specifically illustrated as comprising arithmetic idempotency instruction decoder circuitry, which it will be understood is provided in order to decode the arithmetic idempotency instructions of the present techniques. The instruction decoder 12 asserts control signals 14 in dependence on the instructions it decodes, and these control signals are received by other components of the processor core 4, in order to cause them to operate in accordance with the instructions. The data processing operations defined by the instructions are generally executed by the processing circuitry 16 on values held in the register bank 18. Thus the processing circuitry 16 reads values from and writes values to registers in the register bank 18. The processor core 4 also comprises a load store unit (LSU) 20 by which data values (D) are read from and written to the memory 6. It will be understood by one of ordinary skill in the art that, merely for the sake of brevity and clarity, FIG. 1 is necessarily a relatively high level overview of the data processing apparatus 2 and of course that many components of the data processing apparatus which are not directly relevant to a discussion of the present techniques have been omitted for clarity.

Figure 2A:
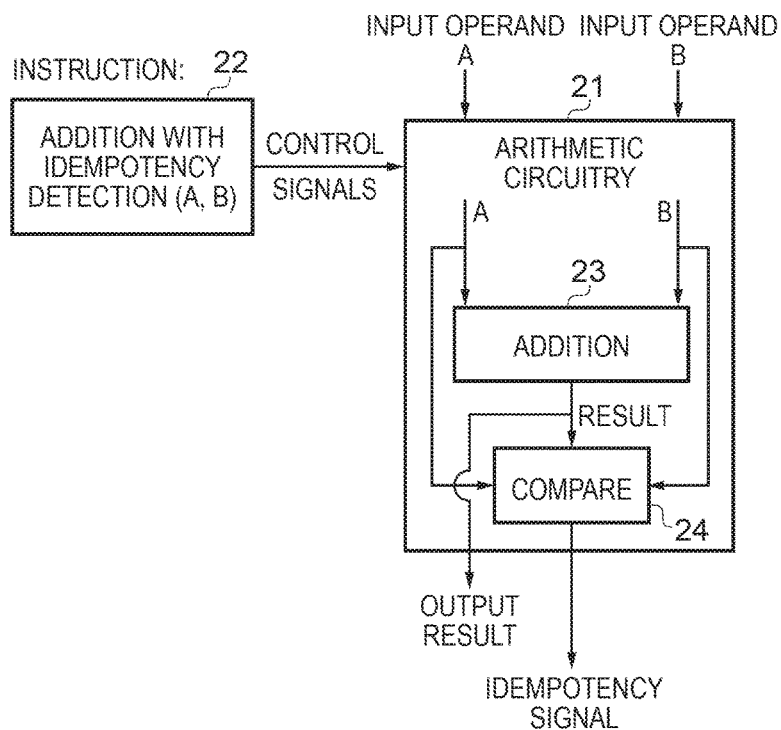
FIG. 2A schematically illustrates arithmetic circuitry in one embodiment which is responsive to an addition with idempotency detection instruction.
Figure 2B:
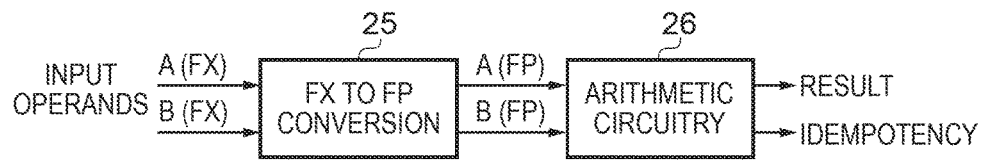
FIG. 2B schematically illustrates format conversion circuitry in one embodiment which converts fixed-point input operands to floating-point format, to be received by arithmetic circuitry which is responsive to an arithmetic operation with idempotency detection instruction.

FIG. 2A schematically illustrates one component which can form part of the processing circuitry 16 in FIG. 1, namely the arithmetic circuitry 21. In the example shown in FIG. 2A, the particular subcomponents shown are those responsive to an addition with idempotency detection instruction 22, which is shown schematically and in shorthand in FIG. 2A asserting control signals to the arithmetic circuitry 21 (this in fact happening by the instruction being decoded and the decoder asserting control signals as described above). This instruction explicitly specifies two input operands A and B, on which the arithmetic circuitry carries out the specified addition operation. Accordingly, these input operands A and B are received by the addition circuitry 23, and the result value of adding A and B together is generated as the result. This result is output as the output result value from the arithmetic circuitry 21. Additionally though, the result is received by comparison circuitry 24 of the arithmetic circuitry 21, which compares this result to each of the input operands A and B. If either A or B is equal to the result and is not zero (the identity element for addition), then the comparison circuitry 24 generates an idempotency signal. In the example of FIG. 2A the arithmetic circuitry could either be constructed to handle floating-point values or to handle fixed-point values—the present techniques are applicable to either. However, when the arithmetic circuitry is constructed to handle floating-point values and the input operands are received as fixed-point values, format conversion circuitry can be provided to pre-convert the input values into the format needed by the arithmetic circuitry. FIG. 2B shows an example of this where the input operands A and B in fixed-point format are converted to floating-point format by conversion circuitry 25 before being received by the floating-point arithmetic circuitry 26.

Figure 2C:
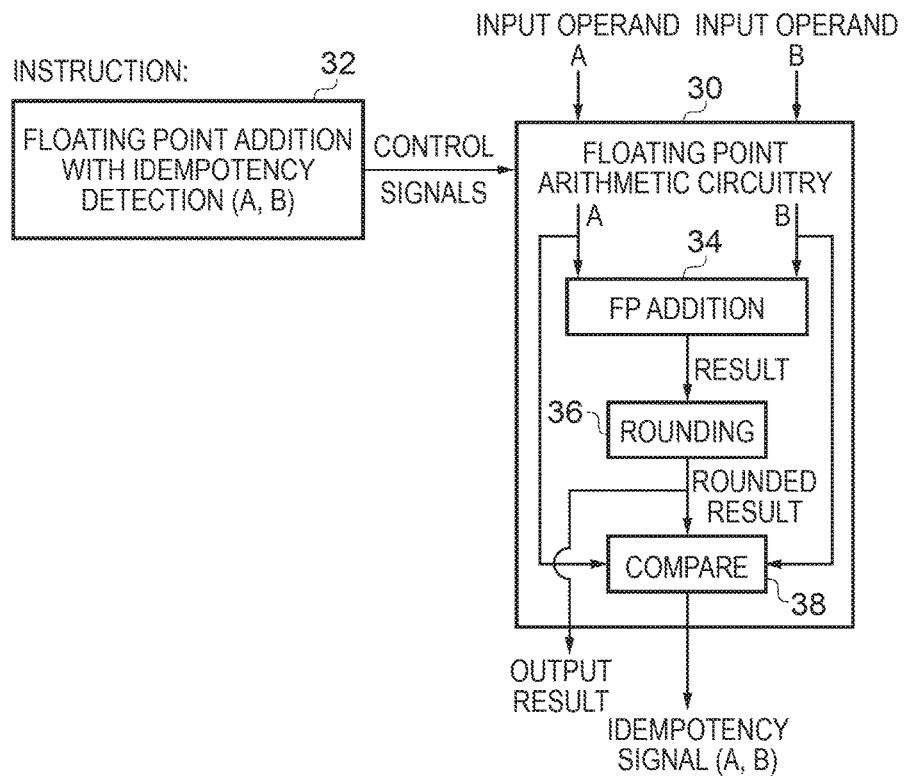
FIG. 2C schematically illustrates arithmetic circuitry in one embodiment which is responsive to a floating-point addition with idempotency detection instruction.

FIG. 2C schematically illustrates one component which can form part of the processing circuitry 16 in FIG. 1, namely the floating-point arithmetic circuitry 30. In the example shown in FIG. 2C, the particular subcomponents shown are those responsive to a floating-point addition with idempotency detection instruction, which is shown schematically and in shorthand in FIG. 2C asserting control signals to the floating-point arithmetic circuitry 30. This instruction specifies two input operands A and B, which are retrieved for the FP arithmetic circuitry to carry out the specified addition operation on. Accordingly, these input operands A and B are received by the FP addition circuitry 34, and the result of adding A and B together is generated as the result value. The FP arithmetic circuitry 30 applies a rounding operation to this result by means of its rounding circuitry 36 and this rounded result is output as the output result from the FP arithmetic circuitry 30. Additionally though, the rounded result is received by comparison circuitry 38 of the arithmetic circuitry 30, which compares this rounded result to one or both of the input operands A and B. In the arrangement shown in FIG. 2C the comparison circuitry 38 compares the rounded result to both of (each of) the input operands A and B. If either A or B is equal to the rounded result and is not zero (the identity element for addition), then the comparison circuitry 38 generates an idempotency signal. In the example shown in FIG. 2C the idempotency signal not only indicates the fact that this idempotency has been identified, but additionally which of the input operands is equal to the output result. In a variant of the arrangement shown in FIG. 2C the comparison circuitry 38 compares the rounded result to just one of the input operands A and B, and the specification in the idempotency signal of which one of the input operands A and B is equal to the output result is then redundant and can be omitted.

Figure 2D:
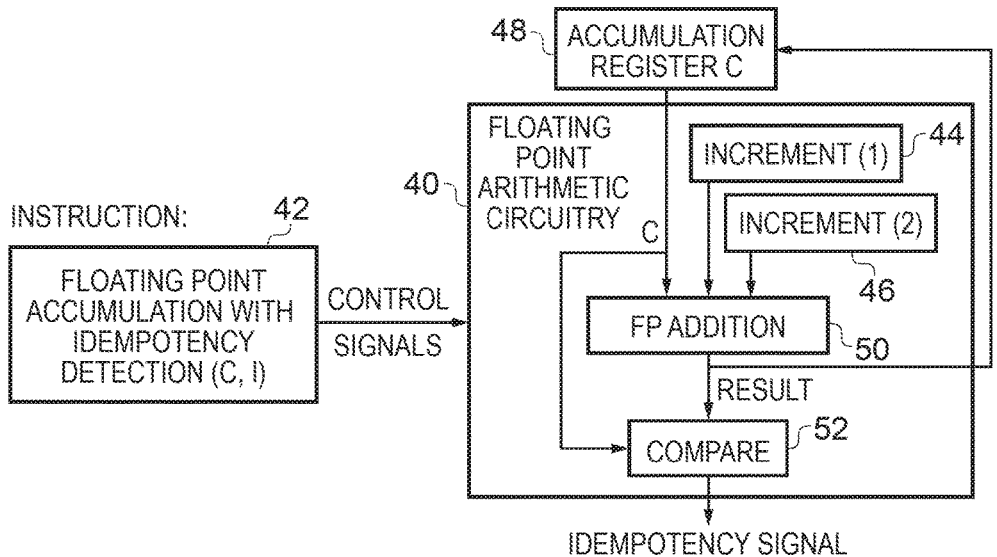
FIG. 2D schematically illustrates arithmetic circuitry in one embodiment which is responsive to a floating-point accumulation with idempotency detection instruction.

FIG. 2D schematically illustrates a variation on the circuitry shown in FIG. 2C in which the addition operation is applied as an accumulation operation. In FIG. 2D the floating-point arithmetic circuitry 40 is similarly responsive to control signals from the instruction decoder of the data processing apparatus, but this is shown in shorthand in FIG. 2D as coming from the instruction 42. The instruction 42 is a floating-point accumulation with idempotency detection instruction which specifies an accumulation register C, and an increment I to be applied to the value stored in that register C. The instruction 42 does not explicitly provide the increment itself, but rather specifies one of two increments which the floating-point arithmetic circuitry 40 can apply, namely a first increment 44 or a second increment 46. In operation, in response to the instruction 42, the content of the accumulation register C 48 is retrieved and passed to the floating-point addition circuitry 50, which adds the specified increment 44 or 46 thereto. The result of this operation is passed to the comparison circuitry 52 which compares the result value to the value of C before the operation. When the result value and the prior value of C are equal (and the increment was not zero) the comparison circuitry generates the idempotency signal. The result value updates the content of the accumulation register 48.

Figure 3:
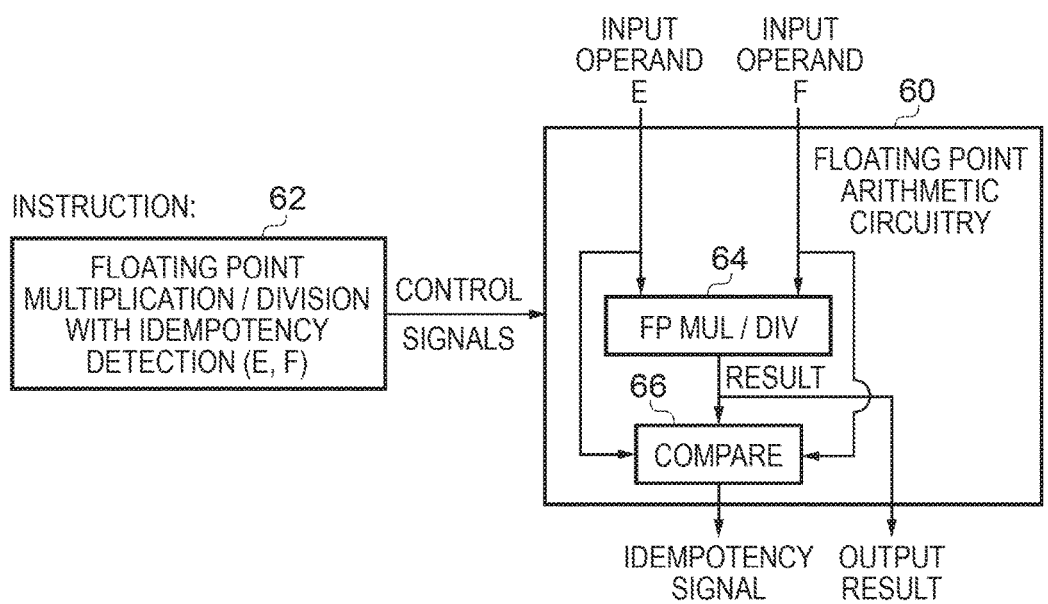
FIG. 3 schematically illustrates arithmetic circuitry in one embodiment which is responsive to a floating-point multiplication or division with idempotency detection instruction.

FIG. 3 schematically illustrates floating-point arithmetic circuitry 60 in its response to two types of instructions, namely a floating-point multiplication or division with idempotency detection instruction 62. The instruction 62 specifies the input operands E and F which are to be multiplied together, or one divided by the other depending on the particular instruction type. The input operands E and F are received by the floating-point multiplication/division circuitry 64 and the result is passed to the comparison circuitry 66 which determines if either of these input operands is equal to the result (and is not one, the identity element for multiplication and division). When one of the input operands E and F is equal to the result value then as well as outputting the result value the comparison circuitry 66 of floating-point arithmetic circuitry 60 generates the idempotency signal.

Figure 4:
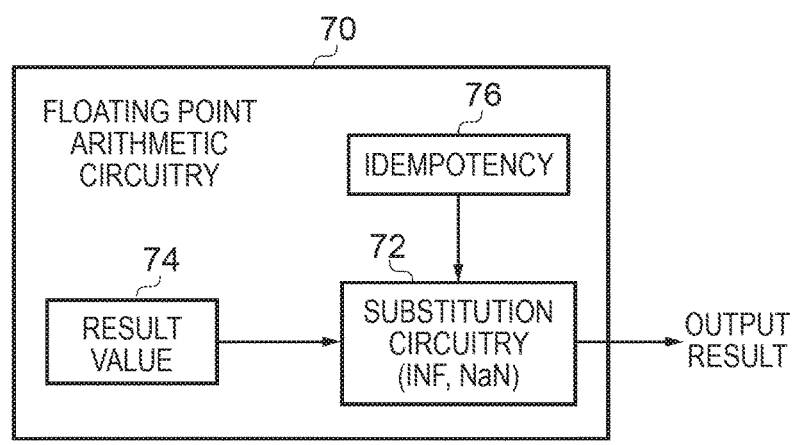
FIG. 4 schematically illustrates arithmetic circuitry in one embodiment in which a substitute result value replaces the outcome of an arithmetic operation when idempotency is detected.

FIG. 4 schematically illustrates floating-point arithmetic circuitry 70 which comprises substitution circuitry 72. It should be noted that the components of the floating-point arithmetic circuitry 70 shown in FIG. 4 should not be considered to be substitutes for those shown in the above described figures but rather these components may be combined with the components of any of those figures. Hence the result value 74, which could for example be generated by any of the above described embodiments, i.e. as the result of an arithmetic operation such as addition, subtraction, accumulation, multiplication, or division, is received by the substitution circuitry 72. The substitution circuitry 72 also receives the idempotency signal 76 and when the idempotency signal is asserted, the substitution circuitry 72 replaces the result value with a special value (the labelling of FIG. 4 indicating that this could for example be INF or NaN), and this special value is then output by the floating-point arithmetic circuitry 70 as the output result.

Figure 5A:
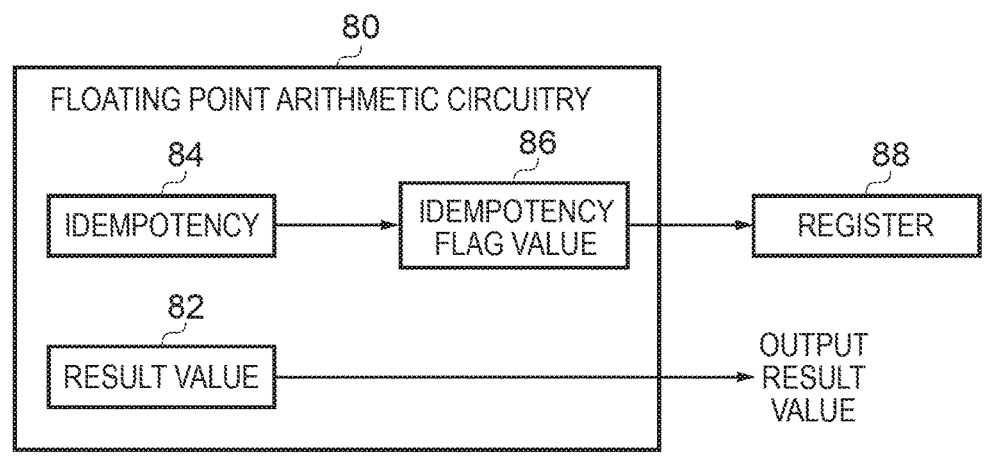
FIG. 5A schematically illustrates arithmetic circuitry in one embodiment in which a flag value is set in a register when idempotency resulting from an arithmetic operation is detected.

FIG. 5A schematically illustrates floating-point arithmetic circuitry 70 the components of which, as was highlighted above with respect to FIG. 4, can be combined with the components of the arithmetic circuitry of any of the above described figures. In the example of FIG. 5A, separately from the result value 82 being provided unamended as the output result value, the idempotency signal 84 causes an idempotency flag value 86 to be written to a register 88. In the specific example contemplated in FIG. 5A the idempotency flag value 86 is in fact a single binary bit (one), which is set in the specified register 88, but variants of the floating-point arithmetic circuitry 80 can write larger values to a register (or other memory storage location) in response to the idempotency signal.

Figure 5B:
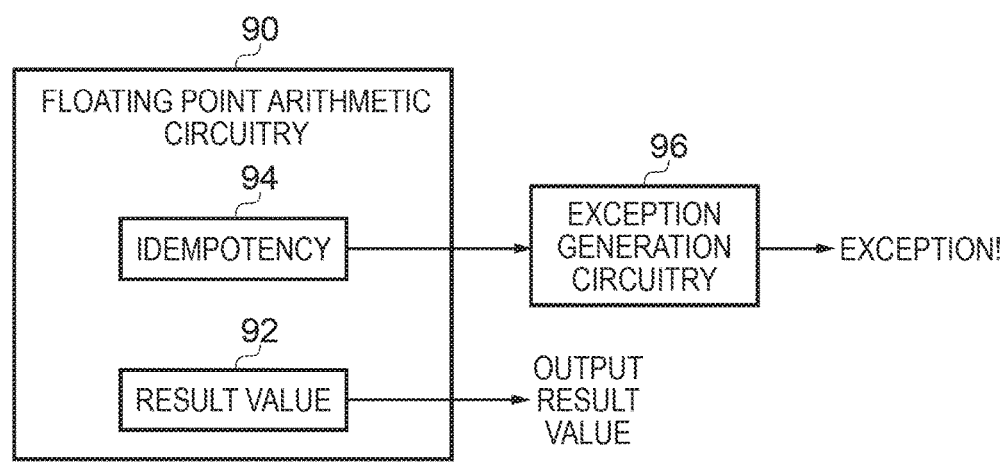
FIG. 5B schematically illustrates arithmetic circuitry in one embodiment in which the detection of idempotency resulting from an arithmetic operation triggers an exception.

FIG. 5B schematically illustrates floating-point arithmetic circuitry 90, the components of which may also be freely combined with the components of the arithmetic circuitry of any of the above described figures. In FIG. 5B the result value 92 is provided unamended as the output result value, and the idempotency signal 94 is provided to exception generation circuitry 96, which responds by generating an exception.

Figure 6:
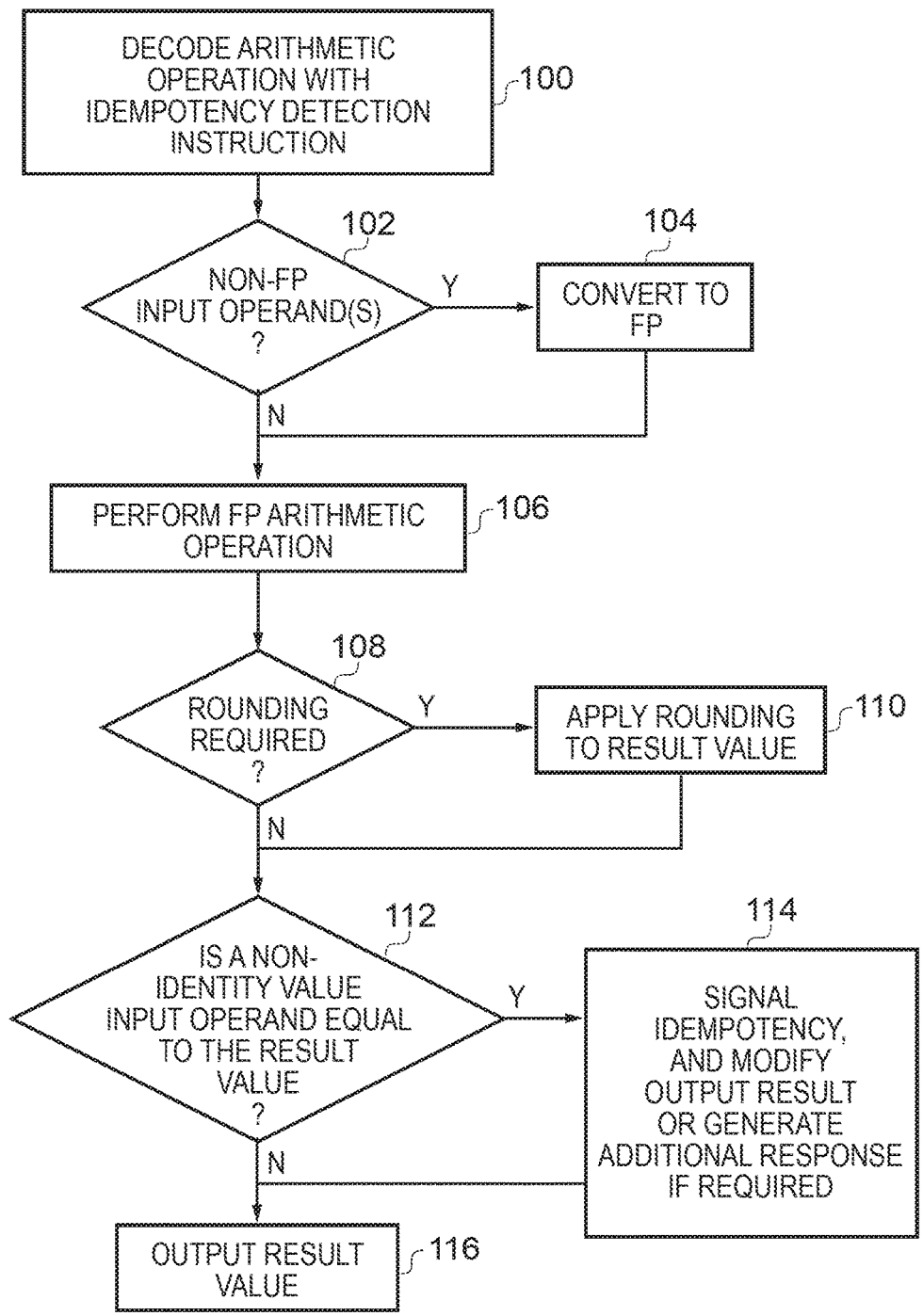
FIG. 6 shows a sequence of steps which are taken in one embodiment when an arithmetic operation with idempotency detection instruction is decoded and executed.

FIG. 6 shows a sequence of steps which are taken according to the method of one embodiment when responding to an arithmetic operation with idempotency detection instruction which may take a variety of specific forms, such as those described above with reference to the preceding figures. The flow begins at step 100, where the instruction is decoded. In this example, where the arithmetic circuitry which will perform the defined arithmetic operation is floating-point arithmetic circuitry, the data processing apparatus is also provided with the capability to convert non-floating-point format input operands into a floating-point format. Thus at the next step 102 it is determined if at least one of the input operands defined by the instruction is in non-floating-point format. This being the case the flow proceeds via step 104 for the format conversion circuitry of the data processing apparatus to convert it to floating-point format. If at step 102 both input operands are already in floating-point format then the flow simply proceeds directly to step 106. Equally, in a variant where the input values are always in floating-point format then step 102 is not required and can be omitted. At step 106 the floating-point arithmetic circuitry performs the floating-point arithmetic operation and next at step 108 it is determined if rounding is required. If it is then the flow proceeds via step 110 for this rounding to be applied to the result value, and otherwise the flow simply proceeds directly to step 112. At step 112 it is determined if one of the input operands is equal to the result value and is not the identity element for the arithmetic operation (i.e. if the arithmetic operation were to be addition, then the identity element would be zero, whereas if the arithmetic operation were to be multiplication then the identity element would be one). If this tested condition is true, then the flow proceeds to step 114 where the idempotency signal is asserted, and depending on the particular configuration, the output result can be modified (e.g. replaced by special value) or an additional response can be generated (e.g. generating an exception). The flow then proceeds to step 116. If the tested condition is found to be not true at step 112 then the flow proceeds directly to step 116, where the output result value is output.

In brief overall summary an apparatus and a corresponding method are disclosed relating to circuitry to perform an arithmetic operation on one or more input operands, where the circuitry is responsive to an equivalence of a result value of the arithmetic operation with at least one of the one or more input operands, when the one or more input operands are not an identity element for the arithmetic operation, to generate a signal indicative of the equivalence. Idempotency (between at least one input operand and the result value) is thus identified.

In the present application, the words "configured to . . . " or "arranged to" are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" or "arranged to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope of the invention as defined by the appended claims. For example, various combinations of the features of the dependent claims could be made with the features of the independent claims without departing from the scope of the present invention.

We claim:
1. A method of processing data comprising:
performing an arithmetic operation on one or more input operands; and
generating a signal indicative of an equivalence of a result value of the arithmetic operation with at least one of the one or more input operands when the one or more input operands are not an identity element for the arithmetic operation.
2. Data processing apparatus comprising:
means for performing an arithmetic operation on one or more input operands; and
means for generating a signal indicative of an equivalence of a result value of the arithmetic operation with at least one of the one or more input operands when the one or more input operands are not an identity element for the arithmetic operation.

\* \* \* \* \*